United States Patent
Ahn et al.

(10) Patent No.: US 10,637,600 B2
(45) Date of Patent: Apr. 28, 2020

(54) METHOD FOR UPLINK TRANSMISSION IN UNLICENSED BAND, AND DEVICE USING SAME

(71) Applicant: LG ELECTRONICS INC., Seoul (KR)

(72) Inventors: Joonkui Ahn, Seoul (KR); Kijun Kim, Seoul (KR); Seungmin Lee, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/535,250

(22) PCT Filed: Dec. 23, 2015

(86) PCT No.: PCT/KR2015/014188
§ 371 (c)(1),
(2) Date: Jun. 12, 2017

(87) PCT Pub. No.: WO2016/105125
PCT Pub. Date: Jun. 30, 2016

(65) Prior Publication Data
US 2017/0373780 A1    Dec. 28, 2017

Related U.S. Application Data

(60) Provisional application No. 62/096,534, filed on Dec. 23, 2014.

(51) Int. Cl.
*H04J 11/00* (2006.01)
*H04W 72/14* (2009.01)
(Continued)

(52) U.S. Cl.
CPC ...... *H04J 11/0023* (2013.01); *H04L 27/2646* (2013.01); *H04W 72/14* (2013.01); *H04W 74/0816* (2013.01)

(58) Field of Classification Search
CPC combination set(s) only.
See application file for complete search history.

(56) References Cited

U.S. PATENT DOCUMENTS

2014/0204850 A1    7/2014  Kim et al.
2014/0334390 A1*  11/2014  Lindholm ............ H04L 5/0007
                                                         370/329
(Continued)

FOREIGN PATENT DOCUMENTS

CN    102549996 A    7/2012
EP       3282803 A1    2/2018
(Continued)

*Primary Examiner* — Zhitong Chen
(74) *Attorney, Agent, or Firm* — Birch, Stewart, Kolasch & Birch, LLP (57) ABSTRACT

A method and a device for uplink transmission in an unlicensed band are provided. The device receives an uplink grant for uplink transmission in an unlicensed band from a base station, and transmits an uplink channel in a subframe in the unlicensed band on the basis of the uplink grant. The subframe comprises a plurality of orthogonal frequency division multiplexing(OFDM) symbols, and at least one of a plurality of the OFDM symbols is defined by gaps during which the uplink channel is not transmitted.

7 Claims, 8 Drawing Sheets

(51) Int. Cl.
*H04L 27/26* (2006.01)
*H04W 74/08* (2009.01)

(56) References Cited

U.S. PATENT DOCUMENTS

| | | | |
|---|---|---|---|
| 2014/0341018 A1 | 11/2014 | Bhushan et al. | |
| 2014/0362780 A1* | 12/2014 | Malladi | H04W 16/14 370/329 |
| 2016/0095134 A1* | 3/2016 | Chen | H04W 72/1268 370/336 |
| 2017/0094528 A1* | 3/2017 | Takeda | H04W 16/14 |
| 2017/0094681 A1* | 3/2017 | Takeda | H04W 16/14 |

FOREIGN PATENT DOCUMENTS

| | | |
|---|---|---|
| KR | 10-2011-0022527 A | 3/2011 |
| KR | 10-2013-0058067 A | 6/2013 |
| WO | WO 2013/009111 A2 | 1/2013 |
| WO | WO 2014/200951 A2 | 12/2014 |

\* cited by examiner

METHOD FOR UPLINK TRANSMISSION IN UNLICENSED BAND, AND DEVICE USING SAME

CROSS REFERENCE TO RELATED APPLICATIONS:

This application is the National Phase of PCT International Application No. PCT/KR2015/014188, filed on Dec. 23, 2015, which claims priority under 35 U.S.C. 119(e) to U.S. Provisional Application No. 62/096,534, filed on Dec. 23, 2014, all of which are hereby expressly incorporated by reference into the present application.

BACKGROUND OF THE INVENTION

Field of the Invention

The present invention relates to wireless communication, and more particularly, to an uplink transmission method in an unlicensed band in a wireless communication system, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method and apparatus for uplink transmission in an unlicensed band.

In an aspect, a method for uplink transmission in an unlicensed band is provided. The method includes receiving, by a wireless device, an uplink grant for uplink transmission in an unlicensed band from a base station, and transmitting, by the wireless device, an uplink channel in a subframe in the unlicensed band based on the uplink grant. The subframe comprises a plurality of orthogonal frequency division multiplexing (OFDM) symbols and at least one OFDM symbol of the plurality of the OFDM symbols is defined by a gap during which the uplink channel is not transmitted.

The wireless device or another wireless device may perform clear channel assessment (CCA) during the gap.

The gap may comprise a last OFDM symbol among the plurality of OFDM symbols.

The gap may comprise a first OFDM symbol among the plurality of OFDM symbols.

In another aspect, an apparatus for uplink transmission in an unlicensed band includes a transceiver configured to transmit and receive a radio signal and a processor operatively coupled to the transceiver. The processor is configured to instruct the transceiver to receive an uplink grant for uplink transmission in an unlicensed band from a base station, and instruct the transceiver to transmit an uplink channel in a subframe in the unlicensed band based on the uplink grant. The subframe comprises a plurality of orthogonal frequency division multiplexing (OFDM) symbols, and at least one OFDM symbol of the plurality of the OFDM symbols is defined by a gap during which the uplink channel is not transmitted.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc.

The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
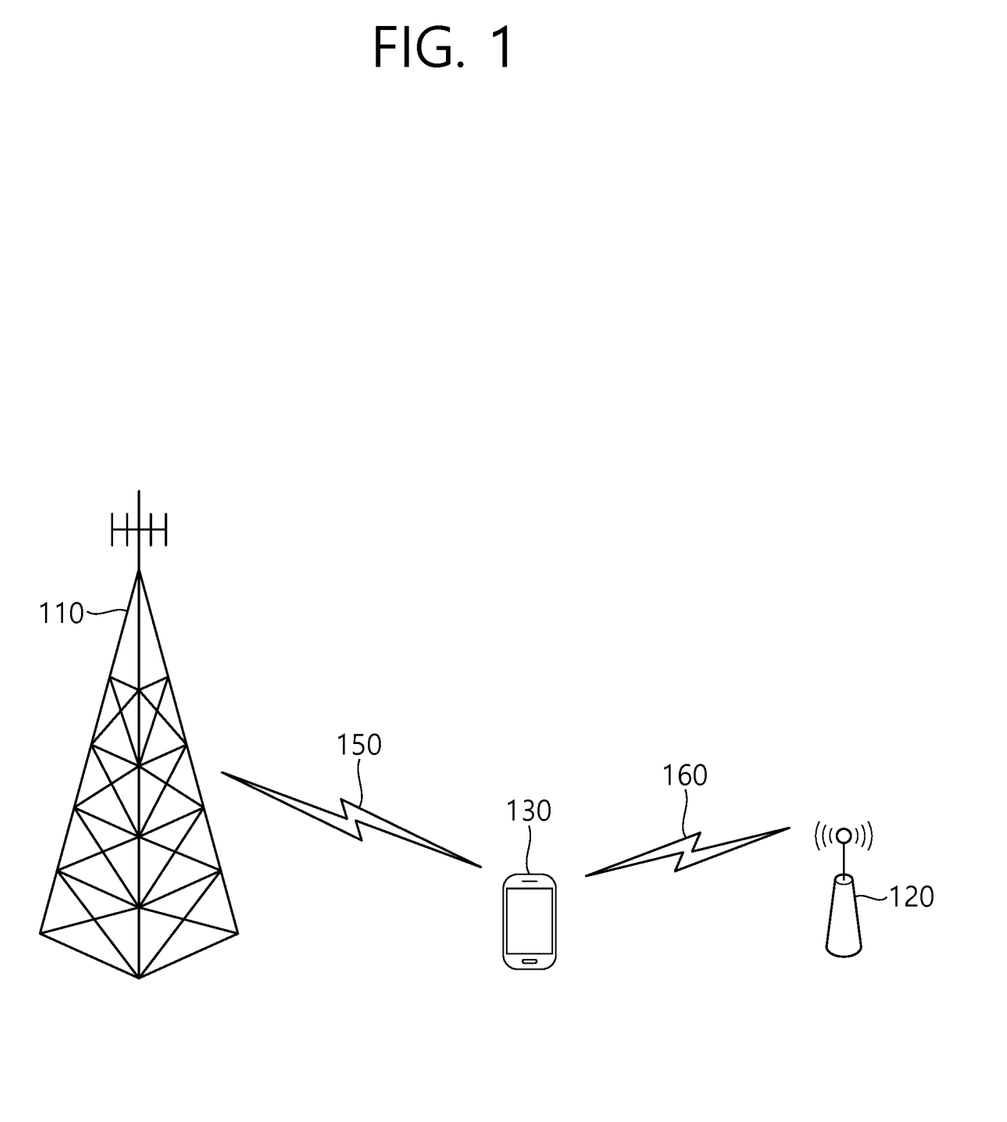
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

A cell (or carrier) operating in an unlicensed band may be called as an unlicensed cell or an unlicensed carrier. A cell operating in a licensed band may be called as a licensed cell or a licensed carrier.

Now, 3GPP LTE downlink (DL)/uplink (UL) scheduling and physical channels will be described.

In 3GPP LTE, the DL/UL scheduling is achieved in unit of subframes. The subframe includes a plurality of orthogonal frequency division multiplexing (OFDM) symbols, and a time required to transmit one subframe is defined as a transmission time interval (TTI). 1 TTI may be 1 ms. In 3GPP LTE, in case of a normal cyclic prefix (CP), one subframe includes 14 OFDM symbols, and in case of an extended CP, one subframe includes 12 OFDM symbols.

In 3GPP LTE, a DL physical channel may include a physical downlink control channel (PDCCH), a physical control format indicator channel (PCFICH), a physical hybrid-ARQ indicator channel (PHICH), and a physical downlink shared channel (PDSCH). A UL physical channel may include a physical uplink control channel (PUCCH) and a physical uplink shared channel (PUSCH).

The PCFICH transmitted in a 1st OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for a UL hybrid automatic repeat request (HARQ). The ACK/NACK signal for UL data on a PUSCH transmitted by the wireless device is transmitted on the PHICH.

Control information transmitted through the PDCCH is referred to as downlink control information (DCI). The DCI may include resource allocation of the PDSCH (this is referred to as a DL grant) and resource allocation of a PUSCH (this is referred to as a UL grant).

Figure 2:
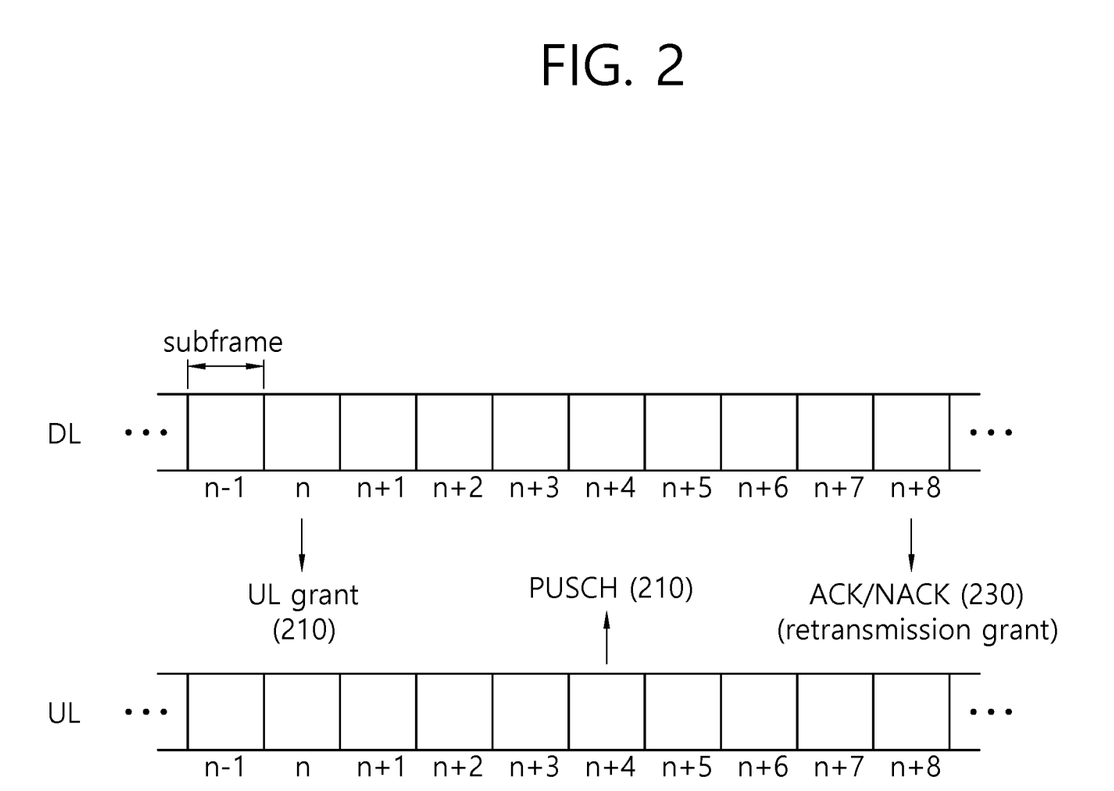
FIG. 2 shows an example of performing uplink (UL) transmission in 3rd generation partnership project (3GPP) LTE.

FIG. 2 shows an example of performing UL transmission in 3GPP LTE.

A UE receives a UL grant 210 having PUSCH resource allocation from a BS in a DL subframe. In addition, the UE transmits a UL transport block to the BS on a PUSCH 220 in a UL subframe n+k. In 3GPP LTE, it is fixed to k=4.

The UE receives an ACK/NACK signal 230 for the UL transport block on a PHICH in a DL subframe n+k+j. Herein, j=4. The ACK/NACK signal may be reception acknowledgement for the UL transport block. The ACK/NACK signal is an ACK signal when decoding of the UL transport block is successful, and is a NACK signal when the decoding of the UL transport block fails. If the ACK/NACK signal is NACK, the BS may transmit a retransmission grant for retransmission to the UE.

The UE may transmit a retransmission transport block to the BS on a PUSCH indicated by the retransmission grant in a UL subframe n+k+j+k.

Figure 3:
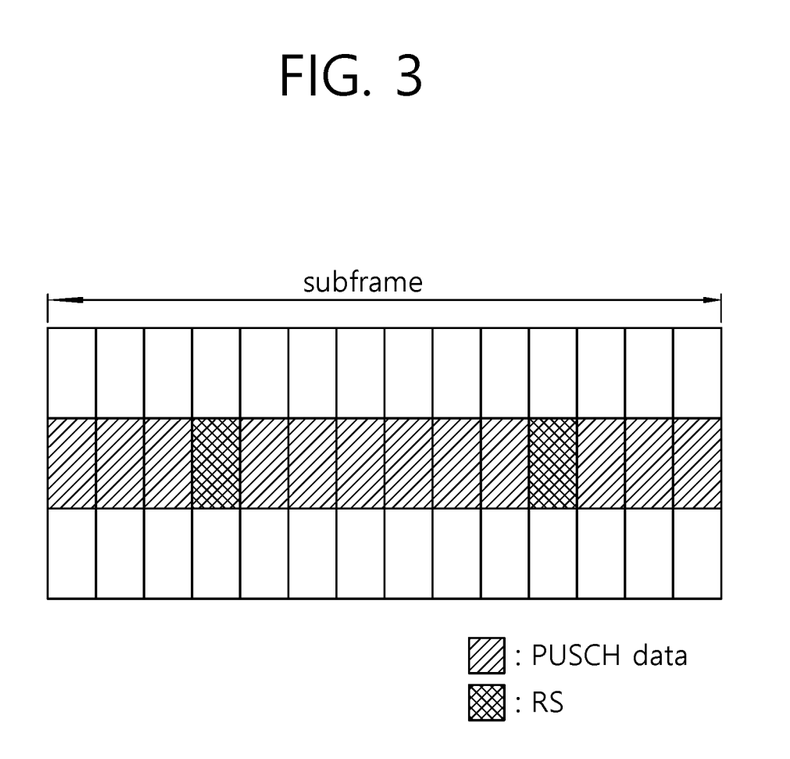
FIG. 3 shows an example of physical uplink shared channel (PUSCH) transmission in 3GPP LTE.

FIG. 3 shows an example of PUSCH transmission in 3GPP LTE.

This is a case where one subframe includes 14 OFDM symbols. A reference signal (RS) for demodulation of PUSCH data is transmitted on 4th and 11th OFDM symbols, and PUSCH data (i.e., a UL transport block) is transmitted on the remaining OFDM symbols.

As described above, in 3GPP LTE, the PUSCH transmission performs in an entire time region of a subframe. When it is said that transmission is performed in the entire time region of the subframe, it may imply that transmission is performed in all OFDM symbols in the subframe. If PUSCH scheduling is performed continuously in consecutive subframes in an unlicensed band, normal UL transmission may be difficult since CCA cannot be performed. For example, assume that a PUSCH1 for a UE1 is scheduled in a subframe i, and a PUSCH2 for a UE2 is scheduled in a subframe i+1. When the UE2 performs the CCA for transmission of the PUSCH2, the UE2 may recognize that a radio medium is not idle due to transmission of the PUSCH1 in a previous subframe i.

Accordingly, hereinafter, it is proposed to define a gap (or a guard period) for performing CCA to start UL transmission or DL transmission. During the gap, a UE or a BS may not be used for any transmission.

The gap may include one or more OFDM symbols. Alternatively, the gap may include not all but some OFDM symbols. For example, the gap may be represented by ½ OFDM symbol, 1 OFDM symbol, 2 OFDM symbol, 3/2 OFDM symbol, etc.

Figure 4:
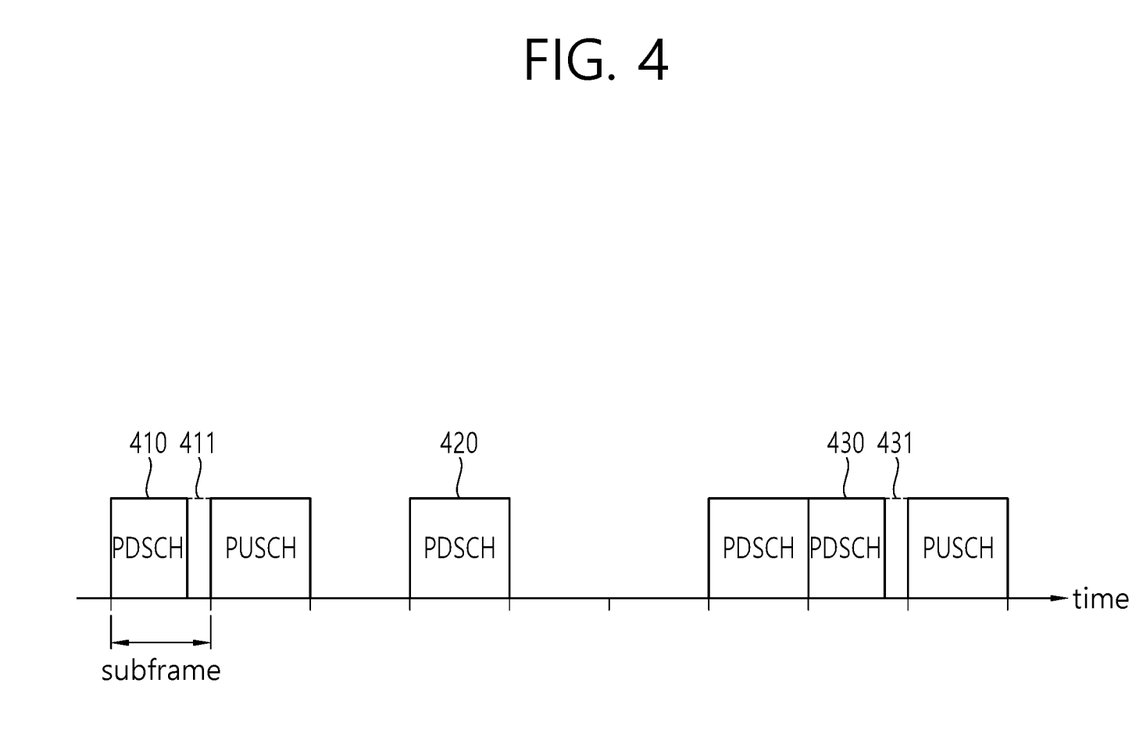
FIG. 4 shows an example in which a gap is defined in downlink (DL) transmission according to an embodiment of the present invention.

FIG. 4 shows an example in which a gap is defined in DL transmission according to an embodiment of the present invention.

To perform CCA for UL transmission in a next subframe, a PDSCH 410 to be transmitted in a current subframe is not transmitted during a gap 411 of a subframe. The gap 411 may include a last OFDM symbol of the subframe. For convenience, a PDSCH of which one part of a subframe is empty is called a truncated PDSCH.

If there is no next UL transmission, a normal PDSCH 420 may be transmitted in a corresponding subframe.

When a plurality of PDSCHs are transmitted in a plurality of consecutive subframes to one UE, the one UE may assume that a last PDSCH 430 to be transmitted in a last subframe is always a truncated PDSCH. That is, a gap 431 exists in a last subframe of a plurality of subframes to be scheduled continuously.

A UE for which a PDSCH is scheduled in subframe i cannot know whether another UE starts UL transmission in a next subframe, and thus cannot know whether a gap exists in a last portion of the PDSCH. Therefore, when PDSCH transmission is scheduled, the BS may inform the UE whether a corresponding PDSCH is a truncated PDSCH or a normal PDSCH. Alternatively, the BS may inform the UE whether a gap exists in a corresponding subframe. This information may be included in a DL grant on a PDCCH.

Figure 5:
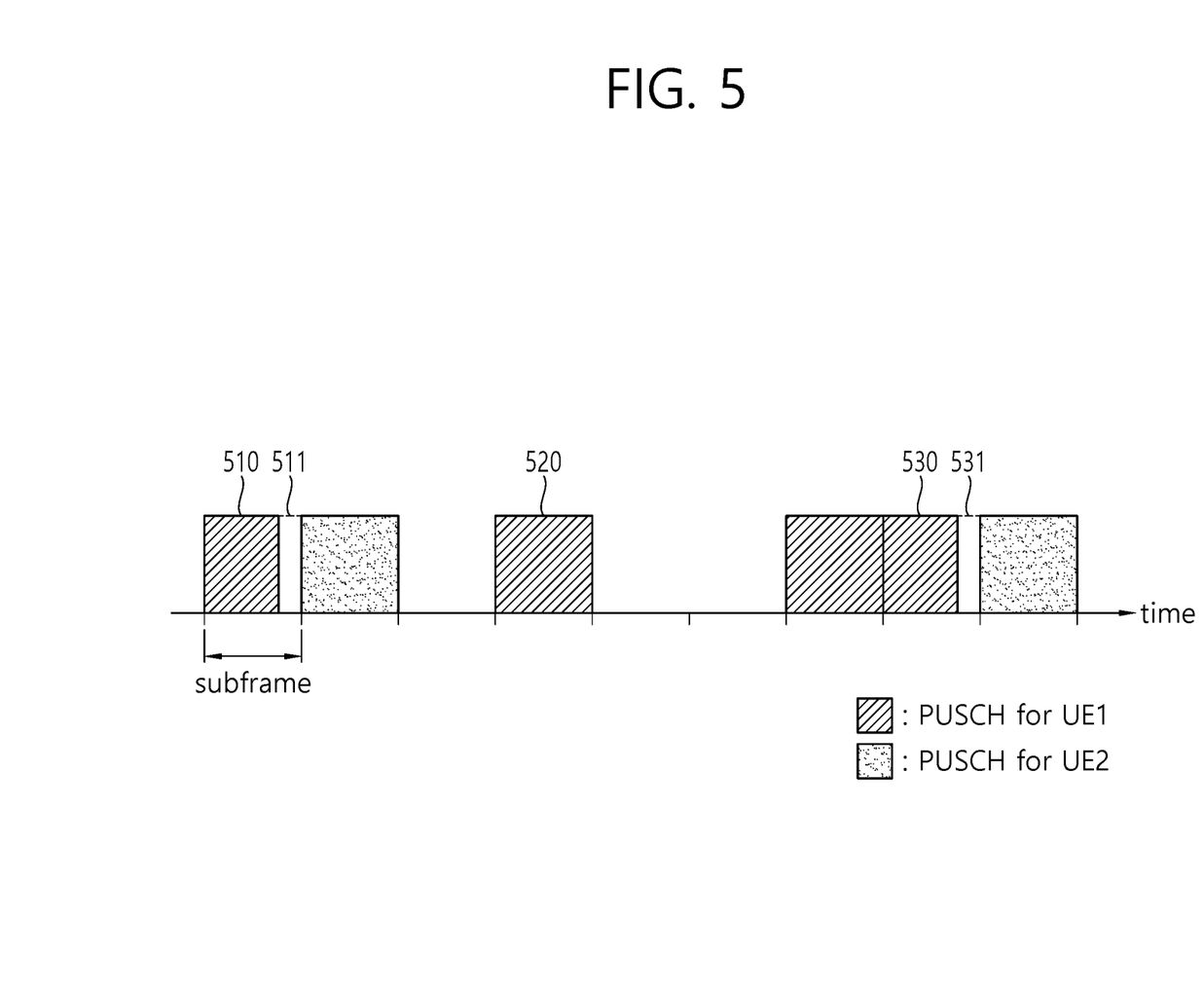
FIG. 5 shows an example in which a gap is defined in UL transmission according to another embodiment of the present invention.

FIG. 5 shows an example in which a gap is defined in UL transmission according to another embodiment of the present invention.

To perform CCA for UL transmission in a next subframe, a PUSCH 510 to be transmitted in a current subframe is not transmitted during a gap 511 of a subframe. The gap 511 may include a last OFDM symbol of the subframe. For convenience, a PUSCH of which one part of a subframe is empty is called a truncated PUSCH.

If there is no next UL transmission, a normal PUSCH 520 may be transmitted in a corresponding subframe.

When a plurality of PUSCHs are scheduled in a plurality of consecutive subframes for one UE, the one UE may assume that a last PUSCH 530 to be transmitted in a last subframe is always a truncated PUSCH. That is, a gap 531 exists in the last subframe of a plurality of subframes to be scheduled continuously. If the plurality of PUSCHs are scheduled continuously in the plurality of consecutive subframes, the UE does not need to generate a gap in a subframe other than the last subframe since it can be seen that the UE continuously occupies a radio medium.

The plurality of consecutive PUSCHs may be scheduled by one UL grant. Alternatively, the plurality of consecutive PUSCHs may be scheduled respectively by a plurality of UL grants.

It may be assumed that the last subframe of the PUSCH scheduled for the UE is always a truncated PUSCH. When the PUSCH is scheduled for the UE through one subframe or a plurality of consecutive subframes, it can be said that the truncated PUSCH is transmitted in the last subframe.

It is sometimes unclear whether the UE will transmit a truncated PUSCH in a corresponding subframe. For example, the UE may miss one part of PUSCH scheduling for a plurality of consecutive subframes. Further, in general, the UE cannot know whether UL/DL transmission by another device (e.g., PUSCH transmission of another UE or DL transmission of a BS) starts in a next subframe. Therefore, a UL grant for scheduling UL transmission may include gap information.

The gap information may include at least one of whether a PUSCH type in a specific subframe is a truncated PUSCH, whether there is a gap in the specific subframe, and whether CCA is performed for scheduled PUSCH transmission.

When the gap does not exist in the subframe i, it may imply that the UE does not perform a CCA operation for transmission in a subframe i+1. When the CCA operation for transmission in the subframe i+1 is not performed, it may imply that the gap does not exist in the subframe i.

Figure 6:
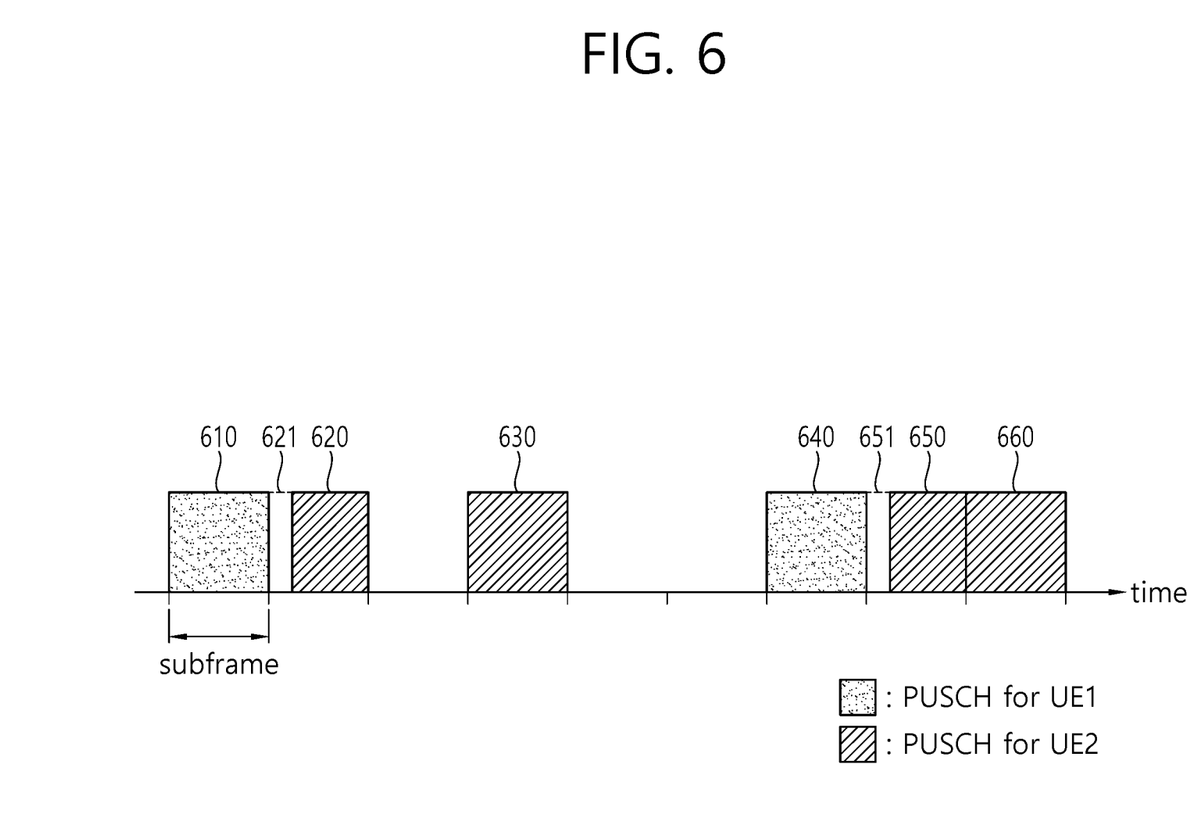
FIG. 6 shows an example in which a gap is defined in UL transmission according to another embodiment of the present invention.

FIG. 6 shows an example in which a gap is defined in UL transmission according to another embodiment of the present invention.

Compared with the embodiment of FIG. 5, a gap 621 begins from a start point of a subframe. To perform CCA for UL transmission in a current subframe, a truncated PUSCH 620 to be transmitted in the current subframe is not transmitted during the gap 621 of the subframe. The gap 621 may include a first OFDM symbol of the subframe. According to a CCA operation of a UE, a duration in which a PUSCH is not transmitted may be longer than a gap 721.

If there is no current UL transmission, a normal PUSCH 630 may be transmitted in a corresponding subframe.

When a plurality of PUSCHs 650 and 660 are scheduled in a plurality of consecutive subframes to one UE, the one UE can assume that a first PUSCH 650 to be transmitted in a first subframe is always a truncated PUSCH. That is, a gap 651 exists in the start of the first subframe of a plurality of subframes to be scheduled continuously. If the plurality of PUSCHs are scheduled continuously in the plurality of consecutive subframes, the UE does not need to generate a gap in a subframe other than the first subframe since it can be seen that the UE continuously occupies a radio medium.

The plurality of consecutive PUSCHs may be scheduled by one UL grant. Alternatively, the plurality of consecutive PUSCHs may be scheduled respectively by a plurality of UL grants.

It may be assumed that the first subframe of the PUSCH scheduled for the UE is always a truncated PUSCH. When the PUSCH is scheduled for the UE through one subframe or a plurality of consecutive subframes, it can be said that the truncated PUSCH is transmitted in the first subframe.

It is sometimes unclear whether the UE will transmit a truncated PUSCH in a corresponding subframe. For example, the UE may miss one part of PUSCH scheduling for a plurality of consecutive subframes. Further, in general, the UE cannot know whether UL/DL transmission by another device (e.g., PUSCH transmission of another UE or DL transmission of a BS) starts in a next subframe. Therefore, a UL grant for scheduling UL transmission may include gap information.

The gap information may include at least one of whether a PUSCH type in a specific subframe is a truncated PUSCH, whether there is a gap in the specific subframe, and whether CCA is performed for scheduled PUSCH transmission.

When the gap does not exist in the subframe i, it may imply that the UE does not perform a CCA operation for transmission in a subframe i. Likewise, when the CCA operation for transmission in the subframe i is not performed, it may imply that the gap does not exist in the subframe i.

In the embodiment of FIG. 5 or FIG. 6, information regarding a subframe in which a gap exists or a subframe in which a gap may exist (this is called a gap subframe) may be given in advance through an RRC message. A BS may provide a UE with information regarding a subframe designated as the gap subframe among a plurality of subframes in a radio frame.

Figure 7:
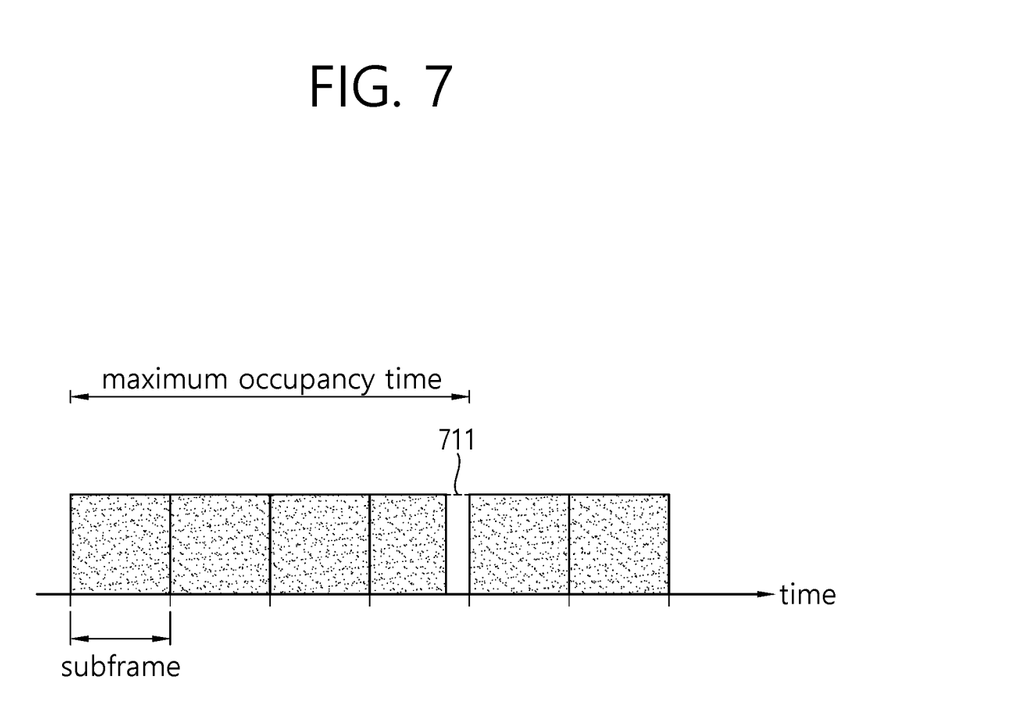
FIG. 7 shows transmission according to another embodiment of the present invention.

FIG. 7 shows transmission according to another embodiment of the present invention.

There may be a limitation on a maximum time (this is called a maximum occupancy time) in which one communication node can continuously transmit a signal through a wireless medium in an unlicensed band. If a DL transmission duration or a UL transmission duration exceeds the maximum occupancy time, there may be a gap in which a BS or a UE does not transmit a signal in the DL transmission duration or the UL transmission duration.

Information regarding the maximum occupancy time may be given in advance through an RRC message to facilitate the determining of whether the gap exists in PDSCH reception or PUSCH transmission of the UE.

In the example of FIG. 7, it is assumed that transmission of 6 consecutive PUSCHs is scheduled for one UE through 6 consecutive subframes. It is also assumed that a maximum occupancy time is 4 ms, that is, 4 subframes. Information regarding the maximum occupancy time may be provided by the BS to the UE. The UE may have a gap 711 at a boundary of a last subframe in the maximum occupancy time. It shows that the gap 711 exists at the end of a 4th subframe.

The UE or the BS may perform CCA during the gap 711 and may not transmit a PUSCH or PDSCH in a next subframe depending on a result of performing the CCA.

Figure 8:
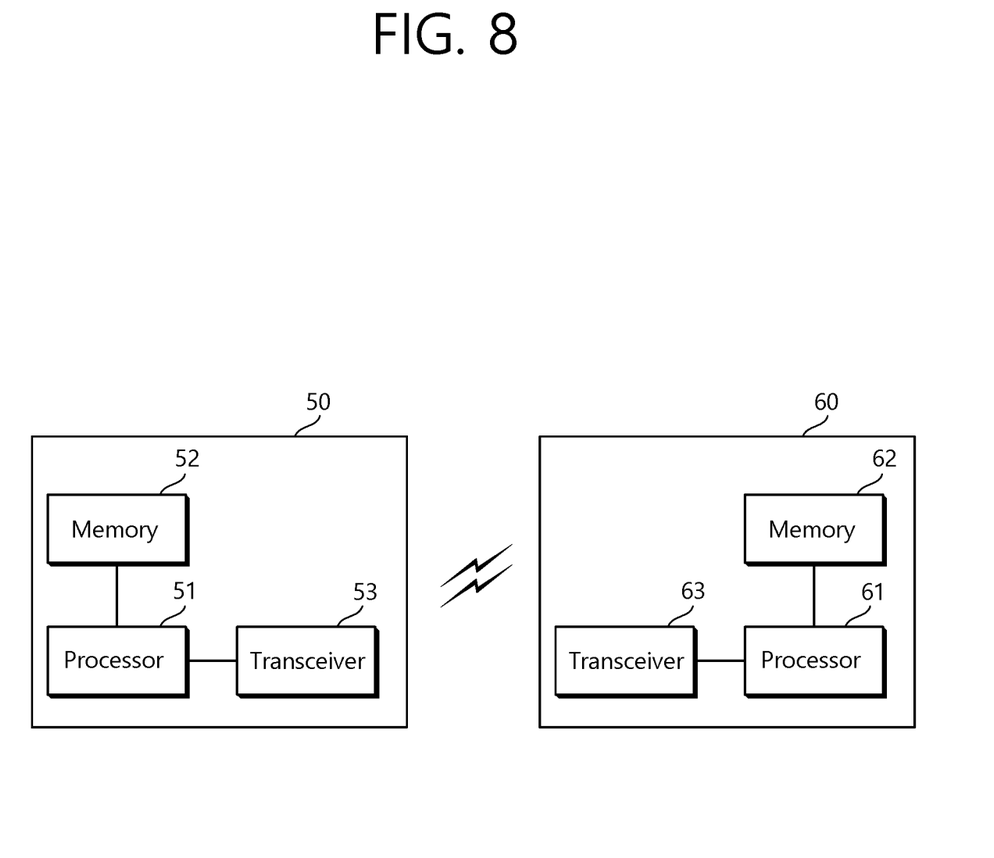
FIG. 8 is a block diagram showing a wireless communication system according to an embodiment of the present invention.

FIG. 8 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for uplink (UL) transmission in an unlicensed band, the method comprising:
   receiving, by a wireless device, a UL grant for physical uplink shared channel (PUSCH) transmission in the unlicensed band from a base station (BS),
   wherein the UL grant comprises resource allocation of consecutive UL subframes for the PUSCH transmission and further comprises information related to an initial portion of the PUSCH transmission in the consecutive UL subframes, wherein an initial orthogonal frequency division multiplexing (OFDM) symbol or a part of the initial OFDM symbol in an initial subframe of the consecutive UL subframes is configured to be empty based on the information of the UL grant; and
   transmitting, by the wireless device, a PUSCH in the consecutive UL subframes of the unlicensed band based on the UL grant,
   wherein each UL subframe comprises a plurality of OFDM symbols.

2. The UL transmission method of claim 1, wherein the wireless device or another wireless device performs clear channel assessment (CCA) based on the UL grant.

3. The UL transmission method of claim 1, wherein the UL grant further comprises information related to whether clear channel assessment (CCA) will be performed for transmission of the PUSCH.

4. The UL transmission method of claim 1, wherein the PUSCH is transmitted via a secondary cell which is anchored by a primary cell.

5. An apparatus for uplink (UL) transmission in an unlicensed band, the apparatus comprising:
   a transceiver configured to transmit and receive radio signals; and
   a processor operatively coupled to the transceiver and configured to:
      instruct the transceiver to receive a UL grant for physical uplink shared channel (PUSCH) transmission in the unlicensed band from a base station (BS),
      wherein the UL grant comprises resource allocation of consecutive UL subframes for the PUSCH transmission and further comprises information related to an initial portion of the PUSCH transmission in the consecutive UL subframes, wherein an initial orthogonal frequency division multiplexing (OFDM) symbol or a part of the initial OFDM symbol in an initial subframe of the consecutive UL subframes is configured to be empty based on the information of the UL grant; and
      instruct the transceiver to transmit a PUSCH in the consecutive UL subframes of the unlicensed band based on the UL grant,
   wherein each UL subframe comprises a plurality of OFDM symbols.

6. The apparatus of claim 5, wherein the apparatus or another apparatus performs clear channel assessment (CCA) based on the UL grant.

7. The apparatus of claim 5, wherein the PUSCH is transmitted via a secondary cell which is anchored by a primary cell.

* * * * *